May 16, 1944.   W. SIMPSON   2,349,118

FUNCTION CAM

Filed March 15, 1943

Inventor:
William Simpson,
by Harry E. Dunham
His Attorney.

Patented May 16, 1944

2,349,118

UNITED STATES PATENT OFFICE 2,349,118

FUNCTION CAM

William Simpson, Schnectady, N. Y., assignor to General Electric Company, a corporation of New York Application March 15, 1943, Serial No. 479,189

7 Claims. (Cl. 74—393)

This invention relates to a function cam, more particularly to such a device which will generate a variable as a function of another variable, and it has for its object the provision of an improved device of this character.

This invention contemplates a mechanism which has rotatable input and output members, and motion transmission means between them. The parts are constructed and arranged so that the rotation of the input member is proportional to a quantity which I shall designate as $x$, and that of the output member is proportional to a function of $x$; that is, where the rotation of the input member is $x$ that of the output member is $y=f(x)$, where $f$ is an arbitrary function.

More specifically, the input and the output members are in the form of spools having surfaces generated by the revolutions of predetermined curves. These surfaces are provided with thread-like slots, and in these slots are threaded cords which constitute driving means between the two spools.

Means are provided for shifting the relative axial position of the spools as they rotate so as to hold the cross-over sections of the cords from one spool to the other in the same angular positions with reference to the axes of rotation of the spools.

In one form of this invention two cords are used, and they are reversely wound upon the two surfaces of the spools. As the driving spool rotates in one direction it winds up one of the cords upon its surface, the second cord being wound upon the surface of the driven spool; when the driving spool rotates in the opposite direction it winds up the second cord upon its surface, while the first is wound upon the surface of the driven spool.

In another form of this invention, the driving and driven spools are provided with separate surfaces for the two cords, one cord being wound upon one set of surfaces and the other cord being reversely wound upon the other set of surfaces.

Figure 1:
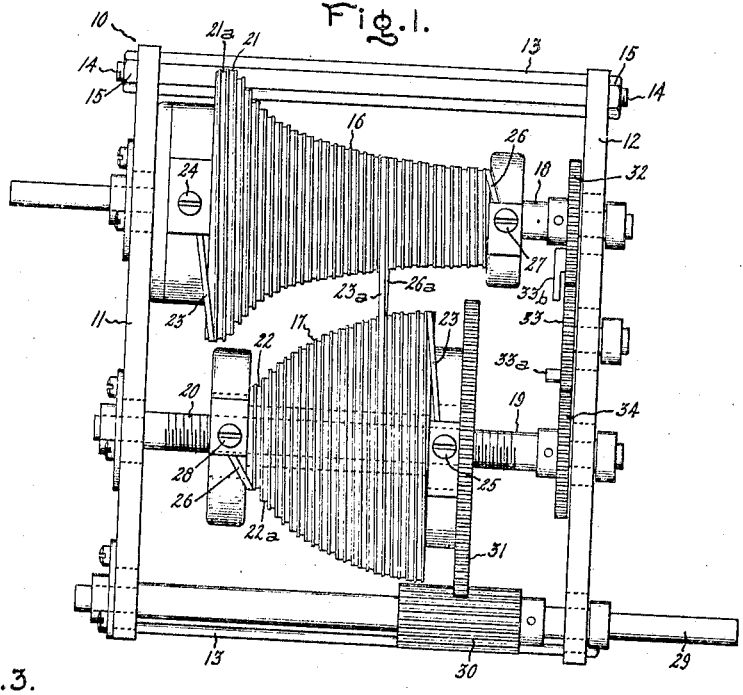
Figure 3:
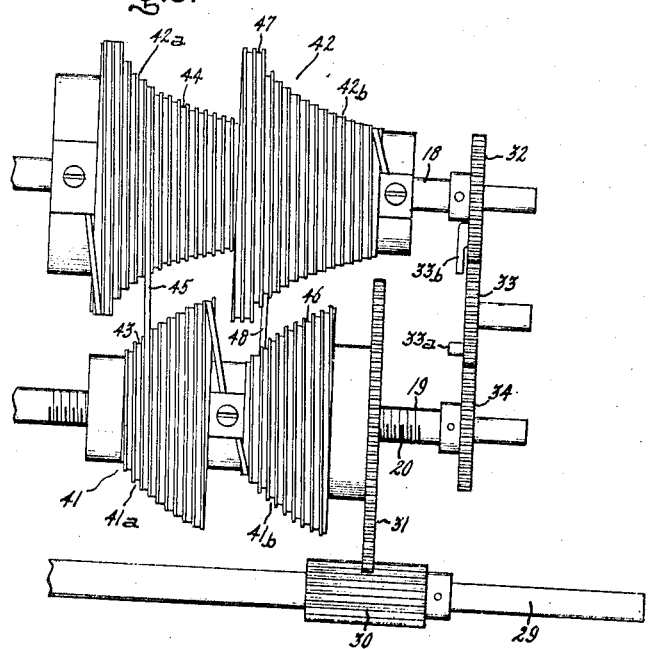
Figure 2:
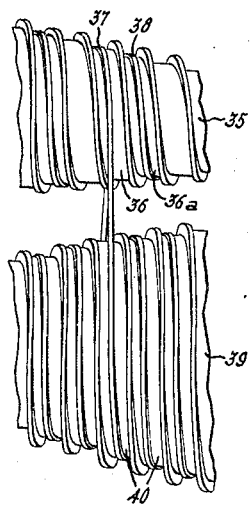

For a more complete understanding of this invention, reference should be had to the accompanying drawing in which Fig. 1 is an elevation of a function cam embodying this invention; Fig. 2 is a fragmentary elevation of a function cam of modified form arranged in accordance with this invention; and Fig. 3 is a fragmentary elevation of another function cam arranged in accordance with this invention.

Referring more particularly to Fig. 1, one form of the function cam arranged in accordance with this invention comprises a frame 10 formed of two spaced side plates 11 and 12 held in spaced-apart relation by columns 13 through which elongated screws 14 are directed. Threaded on the ends of the screws 14 are nuts 15 which function to hold the frame parts in assembled relation.

Mounted within the frame are a pair of spools 16 and 17. The spool 16 is mounted upon a shaft 18 which has its ends journaled in bearings provided for them in the side plates 11 and 12, while the spool 17 is mounted upon a shaft 19 also having bearings journaled in the end plates 11 and 12. The longitudinal axes of the two shafts 18 and 19 are parallel.

One of the spools, for example the spool 16, is rigidly secured to its shaft 18 so as to rotate with it by any suitable means, such as a suitable key (not shown), while the other spool 17 is attached to its shaft 19 through a screw thread 20 for a purpose which will be described in greater detail hereinafter.

The two spools 16 and 17 have predetermined shapes, their surfaces being generated by the revolutions of predetermined curves, the particular shapes of the curves being controlled by the particular problem that is to be solved by the function cam.

The spools 16 and 17, respectively, are provided with a pair of constant lead, scroll slots 21, 21a and 22, 22a. A cord 23 is wound in the slots 21 and 22 of the two spools. This cord is anchored to a screw 24 on the spool 16 at one end of its generated surface, and it is tightly wound in slot 21 on the spool, and also in the slot 22 on the spool 17 so that its other end is brought to the opposite end of the generated surface of spool 17 where it is anchored by a screw 25. A second cord 26 is tightly wound in the second slots 21a and 22a on the two spools 16 and 17, but in the reverse sense; in other words, its first end is anchored to the right-hand end of the generated surface of the spool 16 by means of an anchor screw 27, and from which it is wound in the two slots 21a and 22a in the spool surfaces so that its opposite end is brought to the first end of the generated surface of spool 17 where it is secured by anchor screw 28. The radii of the slots 21, 21a, 22, and 22a are designed so that the cords 23 and 26 will be tight at all times. The two cords 23 and 26 are substantially non-extensible, are flexible, and have a high tensile strength. Stranded steel wires, strong steel ribbons, and steel chains, for example, may be used for the cord members.

Because the two cords 23 and 26 are reversely wound in the manner described, their cross-over sections 23a and 26a from one spool to the other will be located on opposite sides of the common plane passing through the axes of rotation of the two shafts 18 and 19. Also, the leads of the threaded slots are such that these cross-over sections lie in planes that are substantially normal to the axes of rotation.

The particular planes in which the cross-over sections 23a and 26a are located in winding the cords upon the respective spool surfaces is determined by placing the two spools in a predetermined relative reference position. Then the two cords are wound on and crossed over from one spool to the other in positions opposite each other and secured to the spools as described above so that when the spools are rotated they will give the correct relationship between the input and output of the device.

The two cords 23 and 26 constitute driving connection means between the two spools so that when one spool is rotated in one direction one cord will be wound upon its surface and will rotate the second spool from which it unwinds, and at the same time the second cord will be unwound from the first spool and wound upon the second. When the direction of rotation of the first spool is reversed, it winds up the second cord on its surface and unwinds it from the second spool causing it to rotate, the first cord now being unwound from the first spool and wound upon the second.

Either one of the spools 16 or 17 may be the driving spool. In the specific example illustrated, the spool 17 is the input driving spool, while the spool 16 is the output driven spool. The spool 17 is driven by means of a driving shaft 29 which is mounted in the end plates 11 and 12 for rotation on an axis which is parallel to the axes of rotation of the shafts 18 and 19. Mounted upon and secured to the shaft 29 is an elongated spur gear 30 which meshes with a large spur gear 31 attached to the spool 17. When the shaft 29 is rotated it will, of course, rotate the spool 17 and this spool in turn will rotate the spool 16 through the medium of the cords 23 and 26 in the manner explained above. In the specific example illustrated, the rotation of the input shaft 29 is proportional to $x$, and the rotation of the output shaft 18 is proportional to $y$, which is a function of $x$; more specifically, the output shaft rotation is proportional to $x^2$.

It will be understood, of course, that the generated surfaces of the two spools 16 and 17 will depend upon the relationship between the rotation of the input and output shafts that is desired.

In order to keep the planes of the cross-over sections 23a and 26a of the cords always substantially normal to the axes of rotation of the spools 16 and 17, while these spools are rotating, the spools are axially shifted relative to each other. It is for this reason that the spool 17 is connected to its shaft 19 through the thread 20. Furthermore, the shaft 19 is rotated from the spool 16 through spur gears 32, 33 and 34, the gears 32 and 34 being rigidly secured to their shafts 18 and 19 and the gear 33 constituting an idler gear interposed between them. The gearing between the spool 16 and the shaft 19 and the lead of the thread 20 on shaft 19 are arranged so that the movement of the spool 17 is such that the planes of the cross-over sections 23a and 26a are always substantially normal to the axes of rotation.

The gear 33 is provided with a gear stop pin 33a which cooperates with a stop arm 33b attached to gear 32.

The stop arm 33b contacts the pin 33a at the limits of movement of the mechanism for the two directions of rotation of the spools respectively.

In cases where the radii of the cams do not change rapidly with axial distance and where a little looseness in the cords and resulting backlash is permissible, a single scroll slot may be used on each of the two spool surfaces, one cord being wound to the left of the cross-over section on one spool and to the right on the other spool, and the other cord wound in the reverse sense as described above in connection with the case where two slots are provided in each spool. If the driven load is light, extensible cords might be used to avoid looseness or backlash.

In cases where the driven load is small relative to the torque available for driving a single cord could be used with single scroll slots on the input and output spools. In order to keep the cord tight during both directions of rotation, a spring or weight return could be used connected to the driven spool.

Also where no looseness and resulting backlash is permissible, it is not necessary that each of the spool surfaces be provided with the two slots. In Fig. 2, there is illustrated an arrangement wherein one of the spools 35 is provided with two threaded scroll slots 36 and 36a for the two cords 37 and 38, respectively, while the other spool 39 is provided with a single threaded scroll slot 40 for the two cords.

Moreover, it is not necessary that the two cords be wound upon common surfaces as shown in Figs. 1 and 2, but each may have its own set of surfaces; such an arrangement is shown in Fig. 3. As there shown, the driving spool 41 is divided into two sections 41a and 41b which are rigidly secured together. Likewise, the driven spool 42 is provided with two spool surfaces 42a and 42b rigidly secured together. Here the corresponding surfaces 41a and 42a are provided with single thread slots 43 and 44, respectively, for the cord 45; and the two surfaces 41b and 42b are provided with single thread slots 46 and 47, respectively, for the cord 48, which is wound in the slots reversely with reference to the first cord. Otherwise, this form operates in a manner similar to the forms shown in Fig. 1.

While I have shown particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A function cam comprising a driving spool and a driven spool, said spools having surfaces generated by the revolutions of predetermined curves, and said surfaces further being provided with threaded slots, and flexible cords wound in said slots respectively but in the reverse sense, and said cords having their ends connected to the two spools respectively so that the cords constitute a positive driving connection means between said driving and driven spools.

2. A function cam comprising a driving spool and a driven spool, said spools having surfaces generated by the revolutions of predetermined curves, the surfaces of said spools being provided with slots, and a pair of substantially non-extensible cords tightly wound in said slots in the reverse sense and having their ends secured to the two spools respectively so that the cords constitute positive driving connection means between said driving and driven spools.

3. A function cam comprising a driving spool and a driven spool, said spools having surfaces generated by the revolutions of predetermined curves, the surface of one of said spools being provided with a pair of thread-like slots, and that of the other being provided with a single thread-like slot, and a pair of cords tightly wound in the reverse sense in the slots respectively of said one spool and also in the slot on the other, and with their two ends anchored to the two spools respectively so that they constitute positive driving connection means between the driving and driven spools.

4. A function cam comprising a driving spool and a driven spool mounted for rotation on parallel axes, said spools having surfaces generated by the revolutions of predetermined curves, the surfaces of said spools being provided with thread-shaped slots, a pair of cords tightly wound in said slots in the reverse sense and having their ends secured to the two spools respectively so that the cords constitute driving connection means between the driving and driven spools, and means for advancing one of said spools axially as it rotates so as to hold the planes of the cross-over sections of the two cords from one spool to the other in predetermined constant angular relation to said axes of rotation.

5. A function cam comprising a driving spool and a driven spool rotatable on parallel axes having surfaces generated by the revolutions of predetermined curves, said surfaces being provided with thread-like slots, a pair of cords wound in said slots in the reverse sense with their two ends connected at the opposite ends of the slots in the two spools respectively and further so that the sections of the cords passing from one spool to the other lie in planes substantially normal to said axes, and means for moving said spools axially relatively to each other as they rotate so that said planes remain in said positions with relation to said axes.

6. A function cam comprising a driving spool and a driven spool mounted for rotation on parallel axes, said spools having surfaces generated by the revolutions of predetermined curves, and said surfaces being provided with thread-like constant lead slots, a cord having its first end secured to the first end of the generated surface on one of said spools and wound in said slots on said two spools so that its second end is brought to the second end of the generated surface on the other spool where it is secured, a second cord having its first end secured to the second end of the generated surface of said one spool and wound in said slots of the two spools so that its second end is brought to the first end of the other spool where it is secured, whereby the two cords constitute driving connection means between the two spools, and further being wound so that the cross-over sections of the two cords from one spool to the other lie in planes substantially normal to the axes of rotation of said spools, and means for shifting said spools relative to each other in their axial direction as the spools are rotated so that said planes are held in their normal relation to said axes.

7. A function cam comprising a driving spool and a driven spool, each of said spools being provided with a pair of surfaces generated by the revolutions of predetermined curves, one of the surfaces of each spool being provided with a single thread-like slot, and the other two surfaces of the two spools being provided with similar single thread-like slots, a first cord wound in the slots in said first-named surfaces, and a second cord wound in the slots in said second-named surfaces but in a reverse sense with reference to said first cord, the two cords constituting driving connection means between the two spools.

WILLIAM SIMPSON.